(12) United States Patent
Crabb et al.

(10) Patent No.: US 10,886,716 B2
(45) Date of Patent: Jan. 5, 2021

(54) EXPANDED TWO-GANG ELECTRICAL BOX

(71) Applicant: Metra Electronics Corporation, Holly Hill, FL (US)

(72) Inventors: Jessy Crabb, Holly Hill, FL (US); Stewart Denton, Holly Hill, FL (US)

(73) Assignee: Metra Electronics Corporation, Holly Hill, FL (US)

( * ) Notice: Subject to any disclaimer, the term of this patent is extended or adjusted under 35 U.S.C. 154(b) by 7 days.

(21) Appl. No.: 16/454,145

(22) Filed: Jun. 27, 2019

(65) Prior Publication Data

US 2020/0006928 A1    Jan. 2, 2020

Related U.S. Application Data

(60) Provisional application No. 62/690,480, filed on Jun. 27, 2018.

(51) Int. Cl.
*G02B 6/00* (2006.01)
*H02G 3/08* (2006.01)
*H01R 24/78* (2011.01)
*H01R 13/514* (2006.01)

(52) U.S. Cl.
CPC ............. *H02G 3/08* (2013.01); *H01R 13/514* (2013.01); *H01R 24/78* (2013.01)

(58) Field of Classification Search
CPC ........ H02G 3/08; H01R 24/78; H01R 13/514; G02B 6/4448
See application file for complete search history.

(56) References Cited

U.S. PATENT DOCUMENTS

| | | | | |
|---|---|---|---|---|
| 4,958,048 | A * | 9/1990 | Bell | H02G 3/125 174/53 |
| 6,939,179 | B1 * | 9/2005 | Kieffer, Jr. | H01R 13/514 439/650 |
| 9,557,505 | B2 * | 1/2017 | Huegerich | G02B 6/4278 |
| 2006/0153516 | A1 * | 7/2006 | Napiorkowski | H04Q 1/028 385/135 |
| 2008/0131132 | A1 * | 6/2008 | Solheid | G02B 6/4441 398/117 |
| 2014/0219622 | A1 * | 8/2014 | Coan | G02B 6/4471 385/135 |

* cited by examiner

*Primary Examiner* — Ellen E Kim
(74) *Attorney, Agent, or Firm* — J. Wiley Horton (57) ABSTRACT

An electrical box having a standard forward-facing opening but also having an expanded enclosure behind the opening. The opening allows the use of conventional prior art components (such as cover plates). The expanded enclosure allows a more generous bend radius for the creation of a service loop in a fiber optic cable or similar component.

20 Claims, 9 Drawing Sheets

EXPANDED TWO-GANG ELECTRICAL BOX

CROSS-REFERENCE TO RELATED APPLICATIONS

This non-provisional patent application claims the benefit, pursuant to 37 C.F.R. section 1.53, of an earlier-filed provisional application. The provisional application was assigned Ser. No. 62/690,480. Jessy Crabb is named as an inventor in the parent application and in this application.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of wiring. More specifically, the invention comprises an expanded electrical box that allows a larger cable storage volume behind a standard two-gang opening.

2. Description of the Related Art

Fiber optic cables are now commonly used in residential and commercial buildings. These cables carry signals that were previously carried by electrical cables such as RG-6 coaxial cable. As an example, a fiber optic cable is now often directly routed to a wall-mounted television. The electrical and fiber optical cables routed to wall-mounted devices are typically stored in a wall-mounted electrical junction box, and this presents a problem.

A flat screen television is often mounted directly over an electrical box that houses power supply conductors. A separate electrical box is often provided for the audio and video signal cables (whether electrical or optical). The mounted television prevents access to these wall-mounted boxes. A "service loop" (a coil of cable) is provided in each cable so that the television can be pulled away from the wall while the cables are still connected. The term "service loop" means an extra length of cable that allows the television (or similar component) to be pulled away from the electrical box without pulling any connectors free of the television. The word "loop" is used because this excess length is generally formed into a loop as the television is moved back against the wall. The loop is most often pushed into the electrical box so it does not hang free.

The presence of the service loop(s) allows the various cable to be connected to the television—or disconnected from the television—while the television is positional away from the wall. Some television mounts even support the television while it is moved into this distal position to facilitate service.

Figure 1:
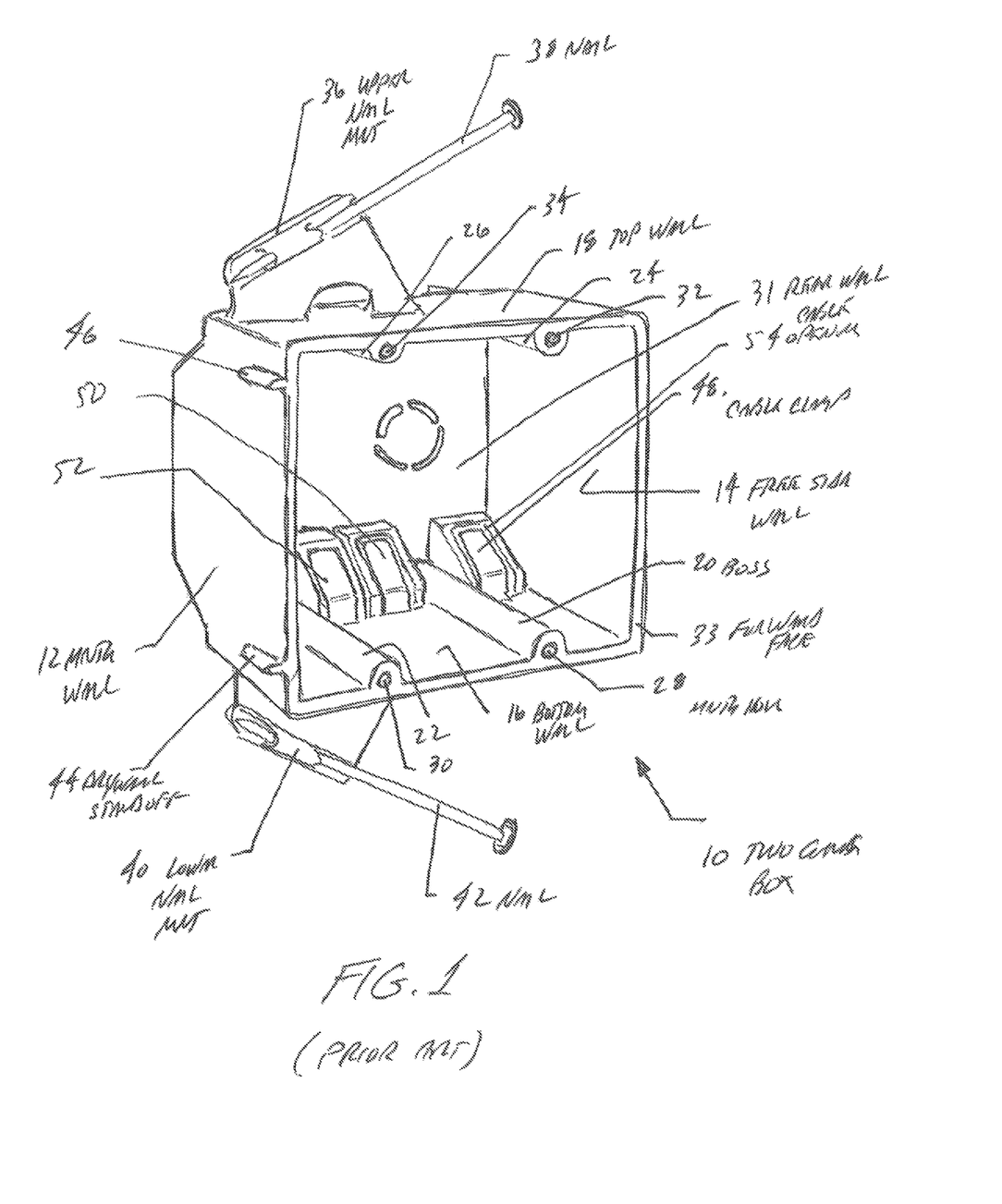
FIG. 1 is a perspective view, showing a prior art twin gang electrical box.

There are many prior art electrical boxes that are used to supply cables needing a service loop. FIG. 1 provides a common example. The reader should bear in mind that such boxes come in many different configurations. The opening size is somewhat standardized, however, and this fact is important. Two-gang box 10 is a standard enclosure intended to house two electrical outlets or two switches (hence the use of the name "two-gang").

The box has four side walls: mounting wall 12, free side wall 14, bottom wall 16, and top wall 18. Mounting wall 18 is configured to rest against the side of a wall stud. Nails 38, 42 are mounted in nail mounts 36, 40. Once the mounting wall is placed against the side of a wall stud, nails 38, 40 are driven laterally into the stud to securely mount the box.

The two-gang box shown is intended for new construction. It is attached to a wall stud before the dry wall is hung. Drywall standoffs 44,46 provide the correct spacing so that forward face 33 of the box will be flush with the drywall when the drywall is installed. The rear extreme of each drywall standoff slips over the forward face of a wall stud to establish the proper position. Essentially, the drywall standoffs 44,46 are as deep as the thickness of the drywall to be used. Different standoff distances are available for different drywall thicknesses.

Prior an electrical boxes are available in left-handed and right-handed versions (with the nails oriented to drive into a stud on the left of the box or on the right of the box). They are also made in "construction" versions and "old work" versions. FIGS. 1-4 illustrate a construction version, which is intended for new construction before drywall is installed. An "old work" version usually includes movable tabs configured to engage the drywall itself rather than a stud. This type may be installed after the drywall is mounted.

Rear wall 31 closes off the rear of two-gang box 10. The forward portion of the box is open. Four bosses 20,22,24,26 provide material in which four mounting holes 28,30,32,34 are made. The four mounting holes are configured to receive screws that attach prior art switches or outlets. A face plate then screws to threaded holes provided on tire switch or outlet. Some face plates are configured to cover portions of electrical outlets, some faceplates are configured to cover portions of electrical switches, and some face plates are configured to mount various data connectors.

The example shown in FIG. 1 includes multiple openings 54 with accompanying cable clamps 48,50,52, As those skilled in the art will know, an electrician pushes a cable through one of these openings and into the box. A cable clamp is pushed out of the way as the cable is introduced. The cable clamp resists the tendency of the cable to slip back out of the box (thereby creating a sort of strain relief).

Figure 2:
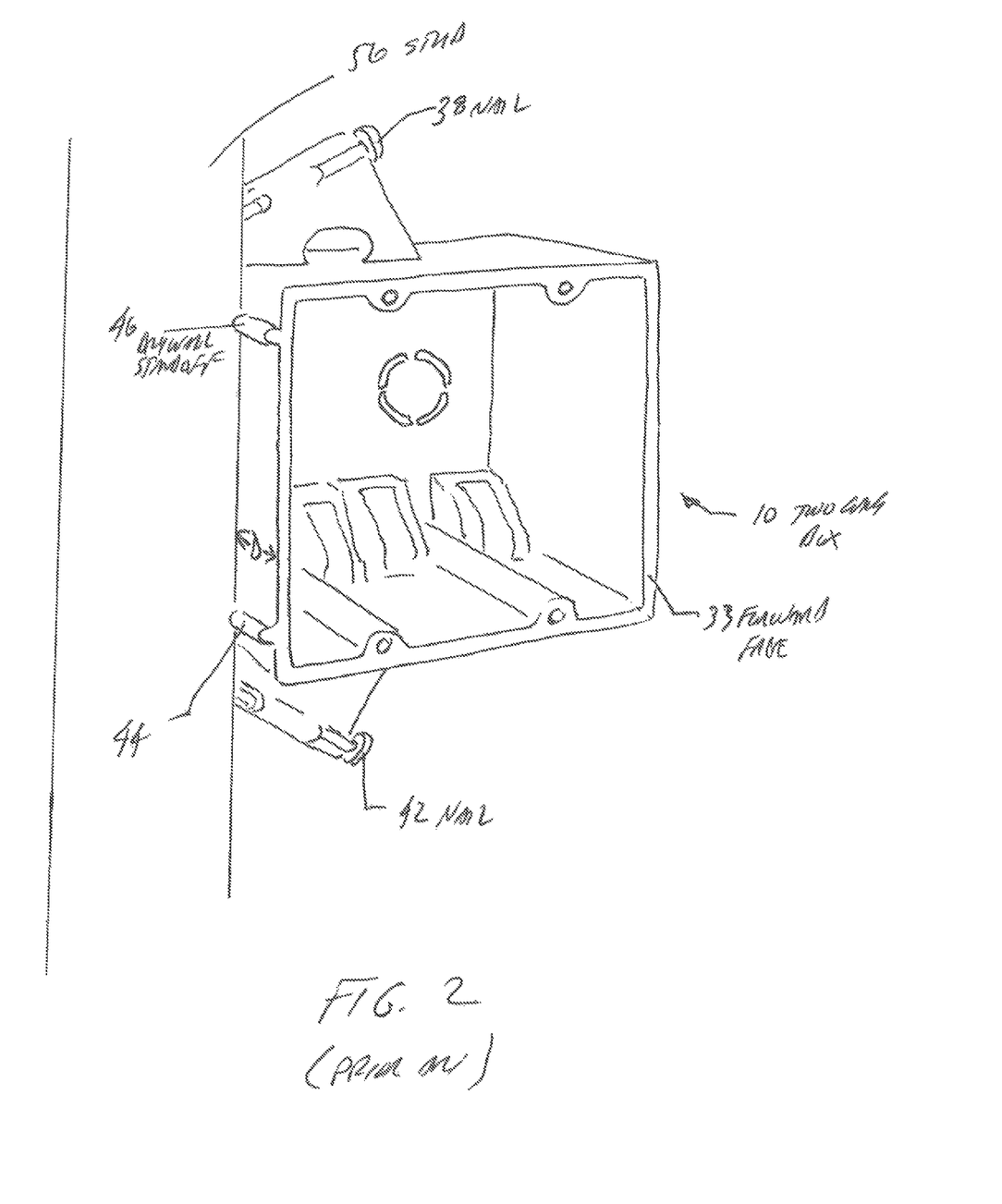
FIG. 2 is a perspective view, showing the electrical box of FIG. 1 installed on a wall stud.

FIG. 2 shows two gang box 10 mounted to stud 56. The reader will note that nails 38,42 have been driven laterally into the stud. The reader will also observe how drywall standoffs 44,46 engage the front face of the stud and provide the proper spacing for the drywall to be flush with forward face 33 of two-gang box 10. In this state the electrical lines and data cables would typically be pulled and inserted into the box for later completion.

Figure 3:
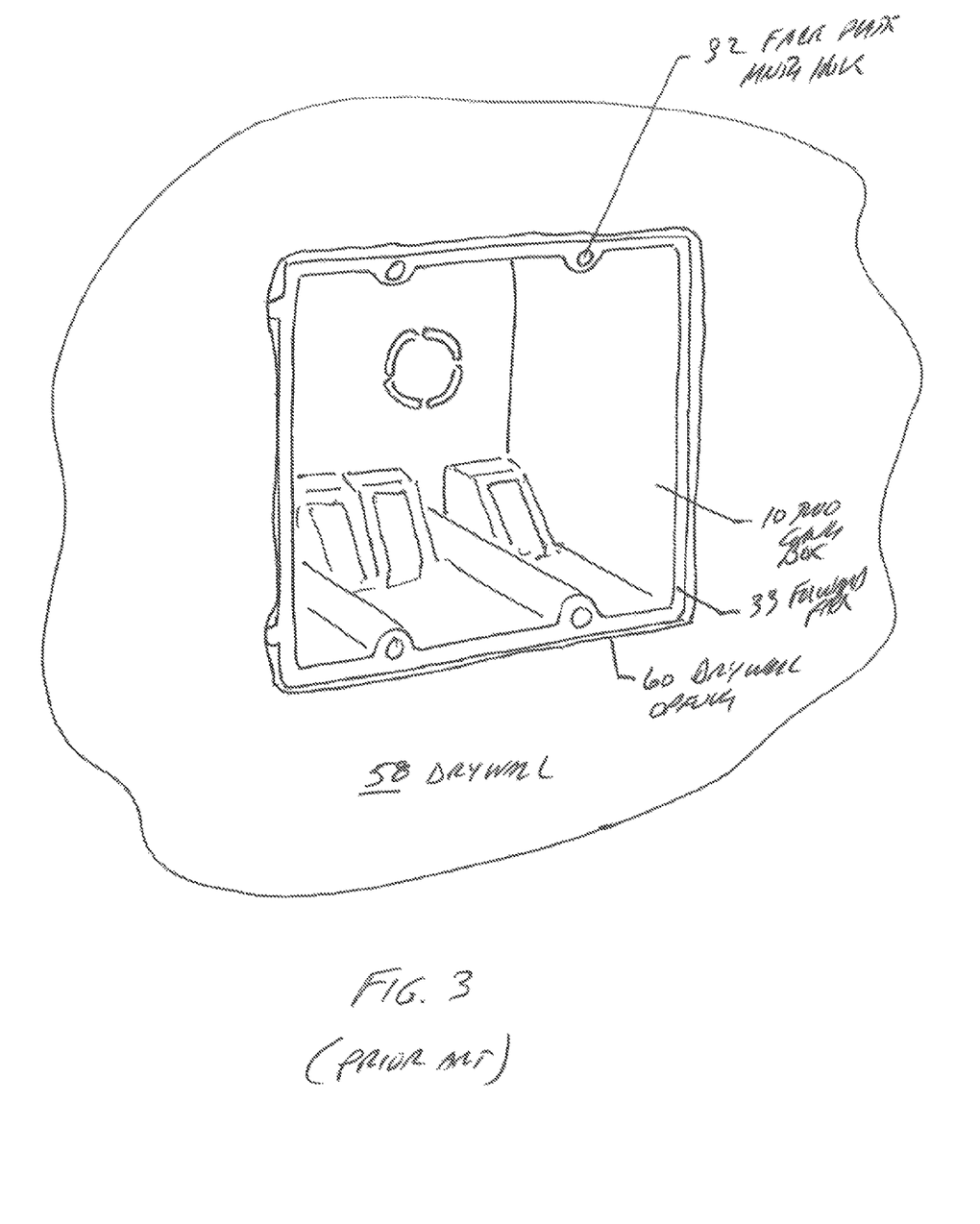
FIG. 3 is a perspective view, showing the configuration of FIG. 2 after the installation of drywall.

FIG. 3 shows the same assembly after the installation of drywall 58. Drywall opening 60 is sized to admit forward face 33 of two gang box 10. Such openings are often made with rotary cutters—allowing the creation of a rectangular opening without fracturing the surrounding dry wall. The fit between the walls of the two-gang box and drywall opening 60 can be fairly crude. A face plate will often be added. The face plate is significantly larger that dry wall opening 60 and its presence "dresses" the final assembly. The reader should note that electrical or data cables would typically be present in the box by the time the drywall is added. These cables are not shown in FIG. 3 for purposes of visual clarity.

Figure 4:
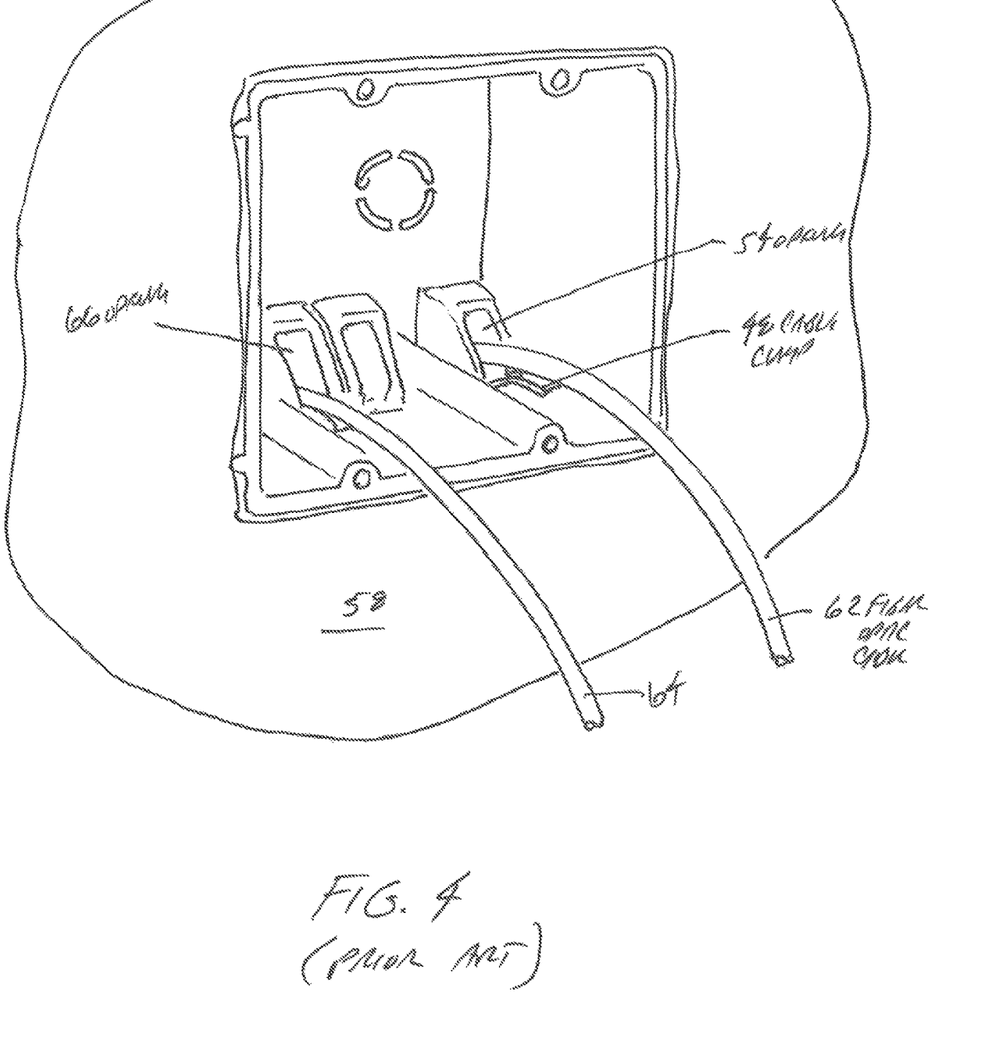
FIG. 4 is a perspective view, showing the configuration of FIG. 3 after the installation of two fiber optic cables.

The cables are shown in FIG. 4. In this view, fiber optic cable 62 has been, pulled through cable opening 54 and secured by cable clamp 48. Likewise fiber optic cable 64 has been pulled through cable opening 66 and secured by the cable clamp associated with that opening.

Figure 5:
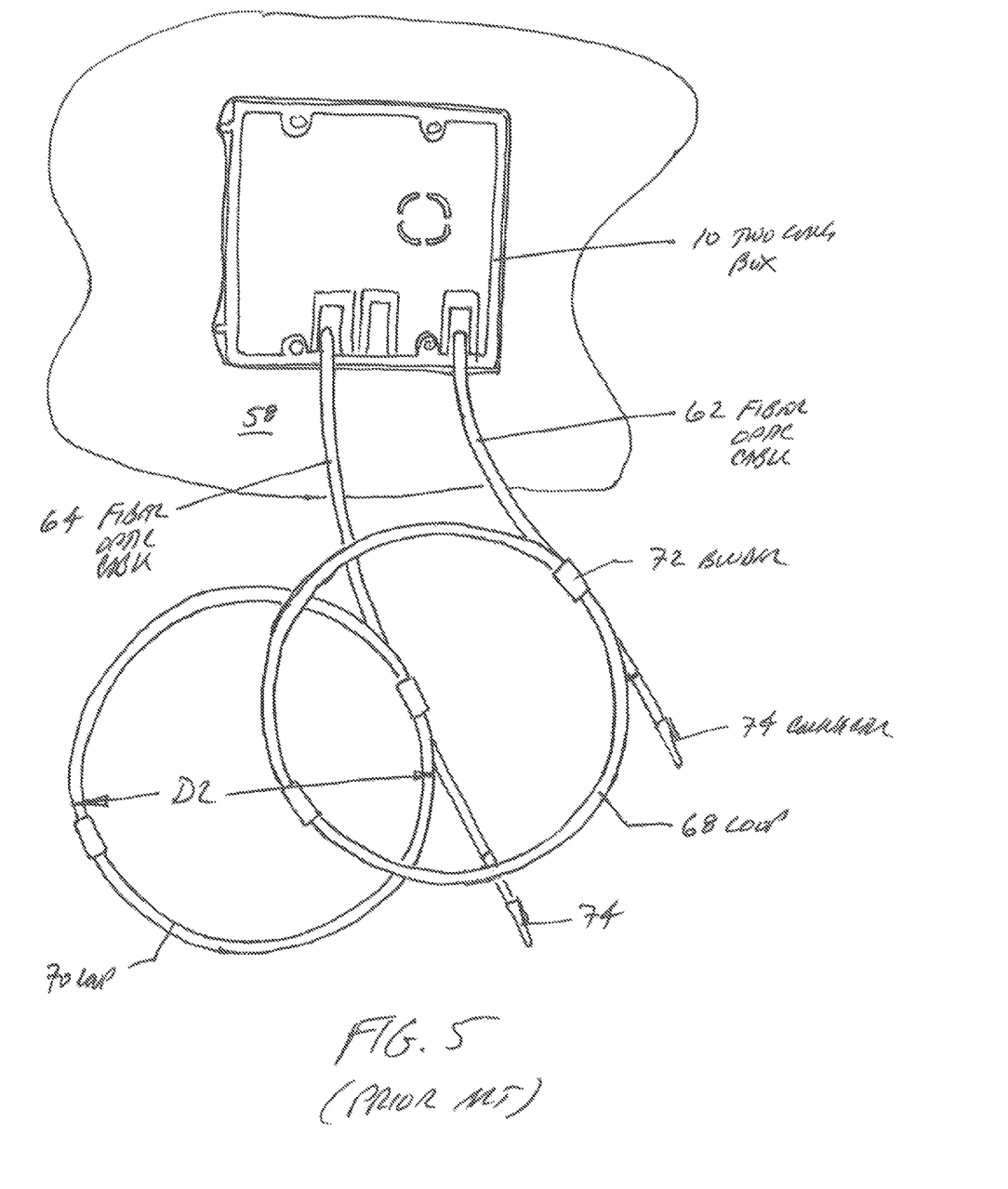
FIG. 5 is an elevation view, showing the configuration of FIG. 4 after each fiber optic cable is formed into a loop.

FIG. 5 shows the two fiber optic cables 62, 64 pulled through the electrical box to a length that is suitable for the installation (including a service loop). Fiber optic cable 62 has been coiled into loop 68 and secured with a pair of binders 72. Likewise, fiber optic cable 64 has been formed into loop 70 and secured with binders 72. A connector 74 has been added to the end of each fiber optic cable. Each connector may provide a termination for multiple optical strands.

Figure 8:
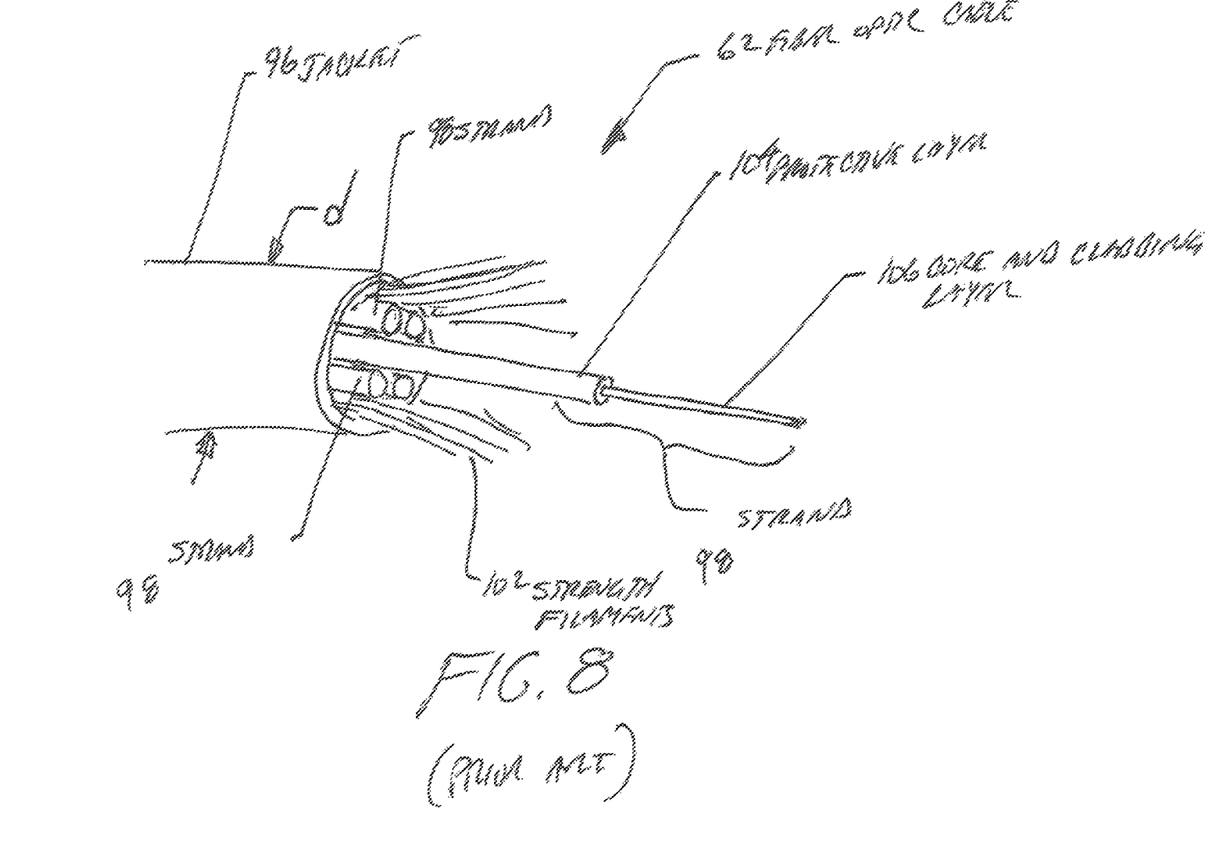
FIG. 8 is a perspective view, showing a prior art multi-stranded fiber optic cable.

FIG. 8 shows an exemplary prior art fiber optic cable 62. This version includes 6 separate optical strands 98. These six strands are contained within a jacket 96, along with strength filaments 102 (non-optical fibers configured to absorb tensile loads). At the center of each optical strand is a core 106 surrounded by a cladding layer. The core itself is glass. The cladding layer is a material that bonds well to the glass and provides total internal reflectance. Protective layer 104 is added over the cladding. The protective layer is typically an acrylate polymer or polyimide.

Most optical data cables run over short to moderate distances are multi-mode optical fiber. These cables carry multiple signals that are separated by wavelength in order to minimize interference. Most such cables have a specified minimum bend radius that can be used during installation and a minimum bend radius dial can be used during operation (often specified as a multiple of the overall diameter "d"). The minimum radius for installation is the minimum bend the cable can undergo without causing plastic deformation or some other form of damage. The operational minimum bend radius is larger. This larger value represents the minimum bend that can be allowed without data corruption.

Optical cables depend upon complete (or very nearly complete) internal reflectance. A tight bend compromises internal reflectance. Further, a tight bend starts to create interference between the different wavelengths that are carried on a multi-mode cable.

Returning to FIG. 5, the reader will readily appreciate a problem with the prior art approach to the installation of fiber optic cables. Loops 68 and 70 are created with an outside diameter of "D2." This diameter represents a suitable minimum bend radius for the cables. A typical minimum operational bend radius for a fiber optic cable is 2.5 inches (63 mm). This requirement produces a minimum loop diameter of 5.0 inches (127 mm). However, a two-gang box typically has internal dimensions of 4.0 inches by 4.0 inches (102 mm by 102 mm). These dimensions are not standardized. The spacing for mounting holes 28, 30, 32, 34 is standardized—since these holes must align with the mounting features on the outlets or switches—but the dimensions of the box itself are not standardized. The width appears to vary between about 3.90 and 4.20 inches (99 mm to 107 mm). The height varies between about 3.90 and 4.10 inches (99 mm to 104 mm).

The existing two-gang boxes do not provide enough room for a suitable service loop diameter when installing fiber optic cables. A tighter radius runs the risk of compromising the transmission of data through the cables. However, in order to place a service loop in a protected position within an electrical box, loops 68 and 70 must be placed within the internal dimensions of prior art two-gang box 10.

In actuality, the installers tighten the loops significantly so they can be stuffed into the prior art box 10. The optical cables will generally still function. However, the data loss rate will be higher and the transmission speed will be reduced. Alternatively, the user may observe drop-out buffering in which a signal periodically syncs and then un-syncs. Neither condition is desirable. A preferable solution would allow the storage of a service loop having a larger diameter. The present invention provides just such a solution.

BRIEF SUMMARY OF THE PRESENT INVENTION

The present invention provides an electrical box having a standard forward-facing opening but also having an expanded enclosure behind the opening. The opening allows the use of conventional prior art components (such as cover plates). The expanded enclosure allows a more generous bend radius for the creation of a service loop in a fiber optic cable or similar component.

REFERENCE NUMERALS IN THE DRAWINGS 10 two-gang box
12 mounting wall
14 free side wall
16 bottom wall
18 top wall
20 boss
22 boss
24 boss
26 boss
28 mounting hole
30 mounting hole
31 rear wall
32 mounting hole
33 forward face
34 mounting hole
36 upper nail mount
38 nail
40 lower nail mount
42 nail
44 drywall standoff
46 drywall standoff
48 cable clamp
50 cable clamp
52 cable clamp
54 cable opening
56 stud 58 drywall
60 drywall opening
62 fiber optic cable
64 fiber optic cable
66 cable opening
68 loop
70 loop
72 binder
74 connector
75 forward face
76 expanded electrical box
78 two-gang opening
80 expanded enclosure
81 forward wall
82 coaming
84 mounting wall
86 free side wall
87 rear wall
88 bottom wall
90 top wall
92 cable opening
94 cable clamp
96 jacket
98 strand
102 strength filaments
104 protective layer
106 core and cladding layer
110 loop
112 loop

DETAILED DESCRIPTION OF THE INVENTION

Figure 6:
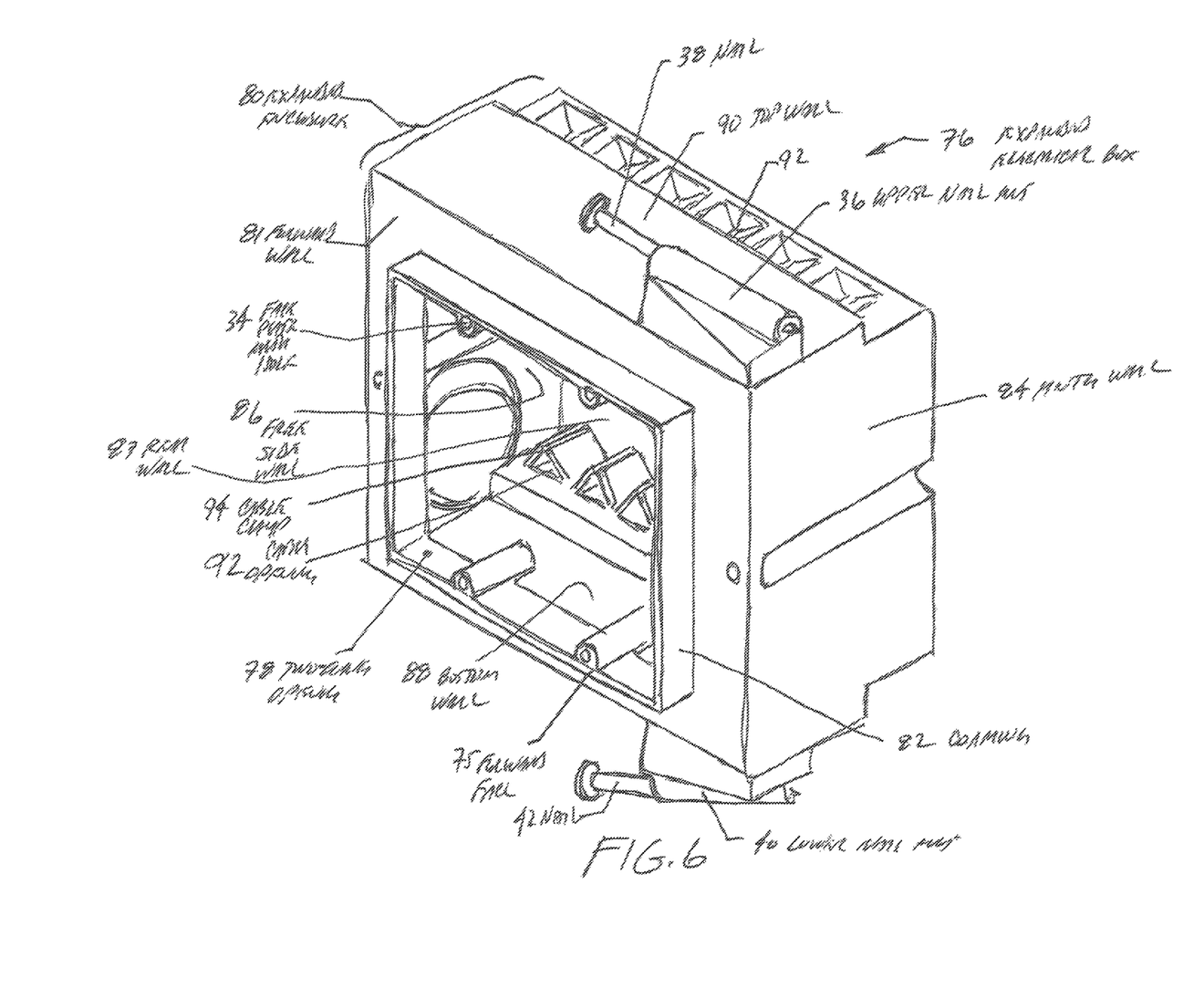
FIG. 6 is a perspective view, showing an embodiment of the present invention.

FIG. 6 depicts a preferred embodiment of the electrical box used to carry out the present invention. Expanded electrical box 16 includes many components. A significant feature is expanded enclosure 80, which is best understood with respect to two-gang opening 78.

Two-gang opening 78 is the semi-standard opening that will actually be exposed through the wall. This is the opening used to conventionally mount a pair of light switches or a pair of electrical outlets. Coaming 82 extends forward from forward wall 81—around the perimeter of the two-gang opening—in a direction that is perpendicular to forward wall 81. The coaming defines the perimeter of the two-gang opening. The forward-most portion of the coaming ends in forward face 75. Four mounting holes (such as 34) are provided in forward face 75. These four mounting holes are provided with the same standardized spacing as for the prior art (such as mounting holes 28, 30, 32, and 34 in FIG. 1).

In comparing FIG. 6 to the prior art electrical box of FIG. 1, the reader will note that forward face 75 and coaming 82 represents the common size of a prior art two-gang box. Expanded enclosure 80 is considerably enlarged and provides more interior room than a conventional two-gang box. Hence the enclosure provided behind forward wall 81 is referred to as expanded enclosure 80.

Mounting wall 84 is configured to mate to the side of a wall stud as for conventional outlet boxes. Bottom wall 88 and top wall 90 are connected to mounting wall 84. Free side wall 86 is connected to bottom wall 88 and top wall 90. Rear wall 87 closes the rear of expanded enclosure 80. Forward wall 81 closes the front side of expanded enclosure 80.

Two-gang opening 78 has a width between about 3.75 and 4.50 inches (95 mm to 114 mm). It has a height between about 3.75 inches and 4.25 inches (95 mm to 108 mm). Expanded enclosure 80 has a greater width and height. The width of expanded enclosure 80 is between about 5.25 inches and about 7.5 inches (133 mm to 191 mm). The expanded enclosure likewise has a height between about 5.25 inches and about 7.5 inches (133 mm to 191 mm).

Many other conventional features can be added to expanded electrical box 76. A plurality of openings 92 and associated cable clamps 94 can be provided on the bottom wall and the top wall. These can be provided on the side walls as well. Upper nail mount 36 mounts nail 38—positioned for driving into a stud abutting mounting wall 84. Lower nail 42 and nail mount 40 are likewise positioned to drive nail 42 into a wall stud. One or more knock out plugs can be provided. Mounting holes for the mounting of a partial or full cover plate or trim plate can also be provided.

Figure 7:
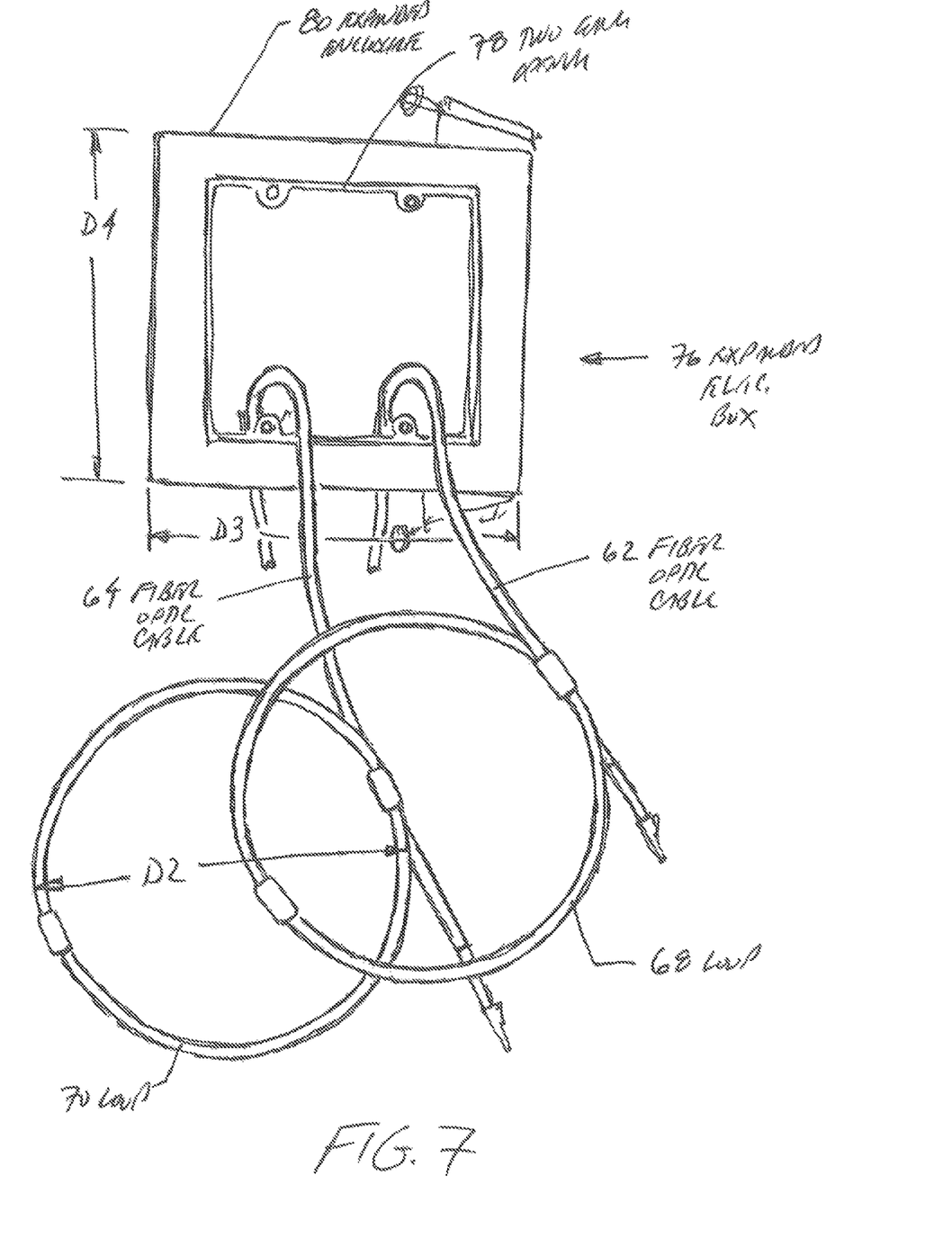
FIG. 7 is an elevation view, showing an embodiment of the present invention.

FIG. 7 depicts the operational advantage of expanded electrical box 76. Fiber optic cables 62, 64 have been fed through openings into expanded enclosure 80 and then out two gang opening 78. Loop 68 is formed in fiber optic cable 62 and loop 70 is formed in fiber optic cable 64. Both loops have an outer diameter D2. D3 is the overall width of expanded enclosure 80. D4 is the overall height of the expanded enclosure. In this version D3 and D4 are the same value. The interior width of expanded enclosure 80 is D3 minus the wall thickness of mounting wall 84 and fee side wall 86. The interior height of expanded enclosure 80 is D4 minus the wall thickness of bottom wall 88 and top wall 90.

A goal of the present invention is to make the interior height and width of expanded enclosure 80 large enough to accommodate loops 68,70 without significant deformation. In other words, the expanded enclosure is made large enough to house the loops without having to bend them into a lighter loop. For many multi-mode Fiber optic cables the minimum loop diameter is about 5.0 inches. This is too large for a standard two-gang box. However, expanded enclosure 80 is large enough to house such a loop if its overall height and width are equal to or greater than 5.25 inches. The upper limit on these dimension is one of practicality. Material cost becomes too great at some point and structural rigidity may be lost. An upper limit of about 7.5 inches on the height and width of expanded enclosure 80 is preferable.

Of course, in order to place loops 68, 70 into expanded enclosure 80 they may have to be bent into a smaller diameter to pass through two-gang opening 78. The reader will recall that a fiber optic cable may be bent into a relatively small bend during installation without causing damage to the cable. It is only during operation that such a tight bend causes data transmission problems. Thus, a cable can be bent fairly sharply to place it into expanded enclosure 80. Once inside, however the cable can expand to a larger loop in order to create a service loop lying within the expanded enclosure. Such a service loop has a sufficient diameter to prevent data corruption during operation.

Figure 9:
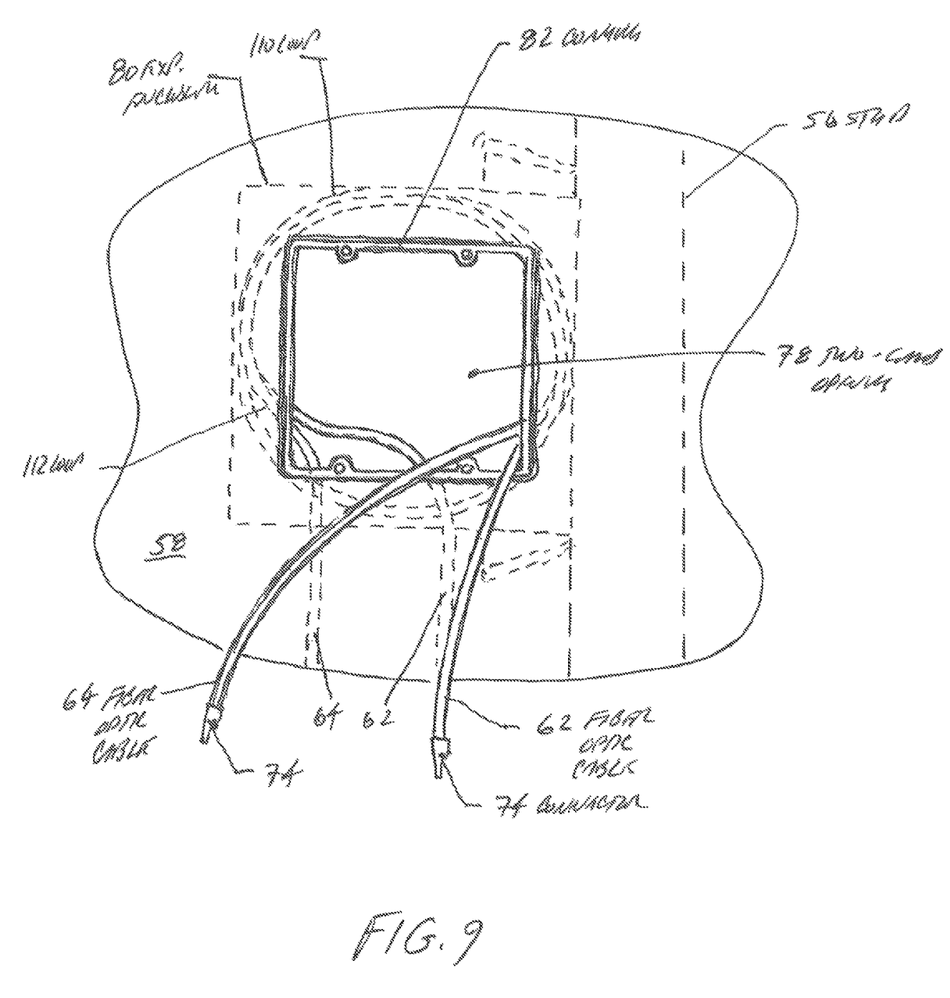
FIG. 9 is an elevation view, showing an embodiment of the present invention in an installed state.

FIG. 9 shows the inventive expanded electrical box installed. The box has been secured to a wall stud 56 using the incorporated nails. A suitable opening has been cut in dry wall 58 so that the front face of coaming 82 is visible through the opening (and the front face lies roughly flush with the surface of the dry wall).

Fiber optic cables 62, 64 run up through the wall (behind the drywall) and into the interior of expanded enclosure 80. The two cables are formed into service loops 110,112 within the expanded enclosure 80. The free end of the fiber optic cables 62, 64 extend out of two-gang opening 78 so that they can connect to a wall-mounted component such as a television. The reader will thereby appreciate that art enlarged service loop is provide for the fiber optic cables without altering the outward appearance of a two-gang box.

Although the preceding descriptions contain significant detail, they should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the claims that are ultimately drafted rather than the examples given.

Having described our invention, we claim:

1. A method of providing an enlarged service loop for a fiber optic cable, comprising:
   (a) providing an expanded electrical box, including,
      (i) a mounting wall,
      (ii) a bottom wall connected to said mounting wall,
      (iii) a top wall connected to said mounting wall,
      (iv) a free side wall, connected to said bottom wall and said top wall,
      (v) a rear wall connected to said mounting wall, said bottom wall, said top wall, and said free side wall,
      (vi) a forward wall connected to said mounting wall, said bottom wall, said top wall, and said free side wall,
      (vii) said mounting wall, said bottom wall, said top wall, said free side wall, said rear wall, and said forward wall forming an expanded enclosure,
      (viii) said forward wall including a two-gang opening,
      (ix) wherein a width of said two-gang opening is between 3.75 and 4.50 inches,
      (x) wherein a height of said two-gang opening is between 3.75 and 4.25 inches,
      (xi) a cable opening,
      (xii) wherein a distance between said bottom wall and said top wall is between 5.25 and 7.50 inches,
      (xii) wherein a distance between said mounting wall and said free side wall is between 5.25 and 7.50 inches;
   (b) providing a fiber optic cable with an end;
   (c) passing said end of said fiber optic cable through said cable opening and into said expanded enclosure; and
   (d) forming said fiber optic cable into a service loop lying within said expanded enclosure with said end of said fiber optic cable passing out through said two-gang opening.

2. The method of providing an enlarged service loop for a fiber optic cable as recited in claim 1, wherein said two-gang opening includes a coaming extending perpendicularly to said forward wall.

3. The method of providing an enlarged service loop for a fiber optic cable as recited in claim 2, wherein said coaming provides a suitable standoff distance for installing dry wall forward of said forward wall.

4. The method of providing an enlarged service loop for a fiber optic cable as recited in claim 1, comprising:
   (a) providing said expanded electrical box with a first nail mount and a first nail;
   (b) placing said expanded electrical box next to a wall stud with said mounting wall mated against, said wall stud; and
   (c) driving said first nail into said wall stud in order to attach said expanded electrical box to said wall stud.

5. The method of providing an enlarged service loop for a fiber optic cable as recited in claim 4, comprising:
   (a) providing said expanded electrical box with a second nail mount and a second nail; and
   (b) driving said second nail into said wall stud in order to attach said expanded electrical box to said wall stud.

6. The method of providing an enlarged service loop for a fiber optic cable as recited in claim 1, wherein said service loop lies tightly within said expanded enclosure.

7. The method of providing an enlarged service loop for a fiber optic cable as recited in claim 4, wherein said two-gang opening includes a coaming extending perpendicularly to said forward wall.

8. The method of providing an enlarged service loop for a fiber optic cable as recited in claim 7, wherein said coaming provides a suitable standoff distance for installing dry wall forward of said forward wall.

9. The method of providing an enlarged service loop for a fiber optic cable as recited in claim 5, wherein said two-gang opening includes a coaming extending perpendicularly to said forward wall.

10. The method of providing an enlarged service loop for a fiber optic cable as recited in claim 9, wherein said coaming provides a suitable standoff distance for installing dry wall forward of said forward wall.

11. A method of providing an enlarged service loop for a fiber optic cable, comprising:
    (a) providing an expanded enclosure having a mounting wall, a bottom wall, a top wall, a free side wall, a rear wall, and a forward wall;
    (b) providing a two-gang opening in said forward wall of said expanded enclosure;
    (c) wherein a width of said two-gang opening is between 3.75 and 4.50 inches;
    (d) wherein a height of said two-gang opening is between 3.75 and 4.25 inches;
    (e) wherein a width of said expanded enclosure is between 5.25 and 7.50 inches;
    (f) wherein a height of said expanded enclosure is between 5.25 and 7.50 inches;
    (g) providing a cable opening in said expanded enclosure;
    (h) providing a fiber optic cable with an end;
    (i) passing said end of said fiber optic cable through said cable opening and into said expanded enclosure; and
    (j) forming said fiber optic cable into a service loop lying within said expanded enclosure with said end of said fiber optic cable passing out through said two-gang opening.

12. The method of providing an enlarged service loop for a fiber optic cable as recited in claim 11, wherein said two-gang opening includes a coaming extending perpendicularly to said forward wall.

13. The method of providing an enlarged service loop for a fiber optic cable as recited in claim 12, wherein said coaming provides a suitable standoff distance for installing dry wall forward of said forward wall.

14. The method of providing an enlarged service loop for a fiber optic cable as recited in claim 11, comprising:
    (a) providing said expanded enclosure with a first nail mount and a first nail;
    (b) placing said expanded enclosure next to a wall stud with said mounting wall mated against said wall stud; and
    (c) driving said first nail into said wall stud in order to attach said expanded enclosure to said wall stud.

15. The method of providing an enlarged service loop for a fiber optic cable as recited in claim 14, comprising:
    (a) providing said expanded enclosure with a second nail mount and a second nail; and
    (b) driving said second nail into said wall stud in order to attach said expanded enclosure to said wall stud.

16. The method of providing an enlarged service loop for a fiber optic cable as recited in claim 11, wherein said service loop lies tightly within said expanded enclosure.

17. The method of providing an enlarged service loop for a fiber optic cable as recited in claim 14, wherein said two-gang opening includes a coaming extending perpendicularly to said forward wall.

18. The method of providing an enlarged service loop for a fiber optic cable as recited in claim 17, wherein said coaming provides a suitable standoff distance for installing dry wall forward of said forward wall.

19. The method of providing an enlarged service loop for a fiber optic cable as recited in claim 15, wherein said two-gang opening includes a coaming extending perpendicularly to said forward wall.

20. The method of providing an enlarged service loop for a fiber optic cable as recited in claim 19, wherein said coaming provides a suitable standoff distance for installing dry wall forward of said forward wall.

\* \* \* \* \*